United States Patent [19]
Kuroda et al.

[11] 3,852,653
[45] Dec. 3, 1974

[54] VOLTAGE PROTECTION CIRCUIT FOR TRANSISTOR REGULATORS

[75] Inventors: Kazusuke Kuroda; Keigo Naoi; Hitoshi Minorikawa, all of Hitachi-shi, Japan

[73] Assignee: Hitachi, Ltd., Tokyo, Japan

[22] Filed: July 3, 1969

[21] Appl. No.: 838,916

[30] Foreign Application Priority Data
July 5, 1968 Japan............................ 43-56656

[52] U.S. Cl......................... 320/64, 322/28, 317/31
[51] Int. Cl............................................. H02j 7/24
[58] Field of Search .................. 320/61, 64, 68, 48; 322/28, 73, 99; 317/30, 31

[56] References Cited
UNITED STATES PATENTS

| | | | |
|---|---|---|---|
| 3,668,504 | 6/1972 | Kawashima............................ | 320/64 |
| 3,219,903 | 11/1965 | Larson.................... | 320/61 |
| 3,363,167 | 1/1968 | Szabo et al. .......................... | 322/28 |
| 3,437,879 | 4/1969 | Snedeker.............................. | 322/28 |
| 3,469,168 | 9/1969 | Harland, Jr. et al.................. | 322/28 |

Primary Examiner—J. D. Miller
Assistant Examiner—Robert J. Hickey
Attorney, Agent, or Firm—Craig, Antonelli, and Hill

[57] ABSTRACT

A voltage regulator circuit is operated by the on-off operation of a Zener diode which is connected with a battery terminal, the output terminal of a generator being connected therewith, which detects the charging voltage of the battery in order that the exciting current flowing through the field winding of the generator may be controlled to maintain the output voltage of the charging generator always at a constant value which voltage would otherwise be generated depending on the revolution speed of the driving engine, and simultaneously, making provision against a disabled state of the charging circuit or the detection circuit of the battery charging voltage, an emergency voltage detection circuit is provided at the output terminal of the generator to actuate the aforesaid Zener diode thereby operating the voltage regulator circuit by means of the output voltage of the generator.

8 Claims, 4 Drawing Figures

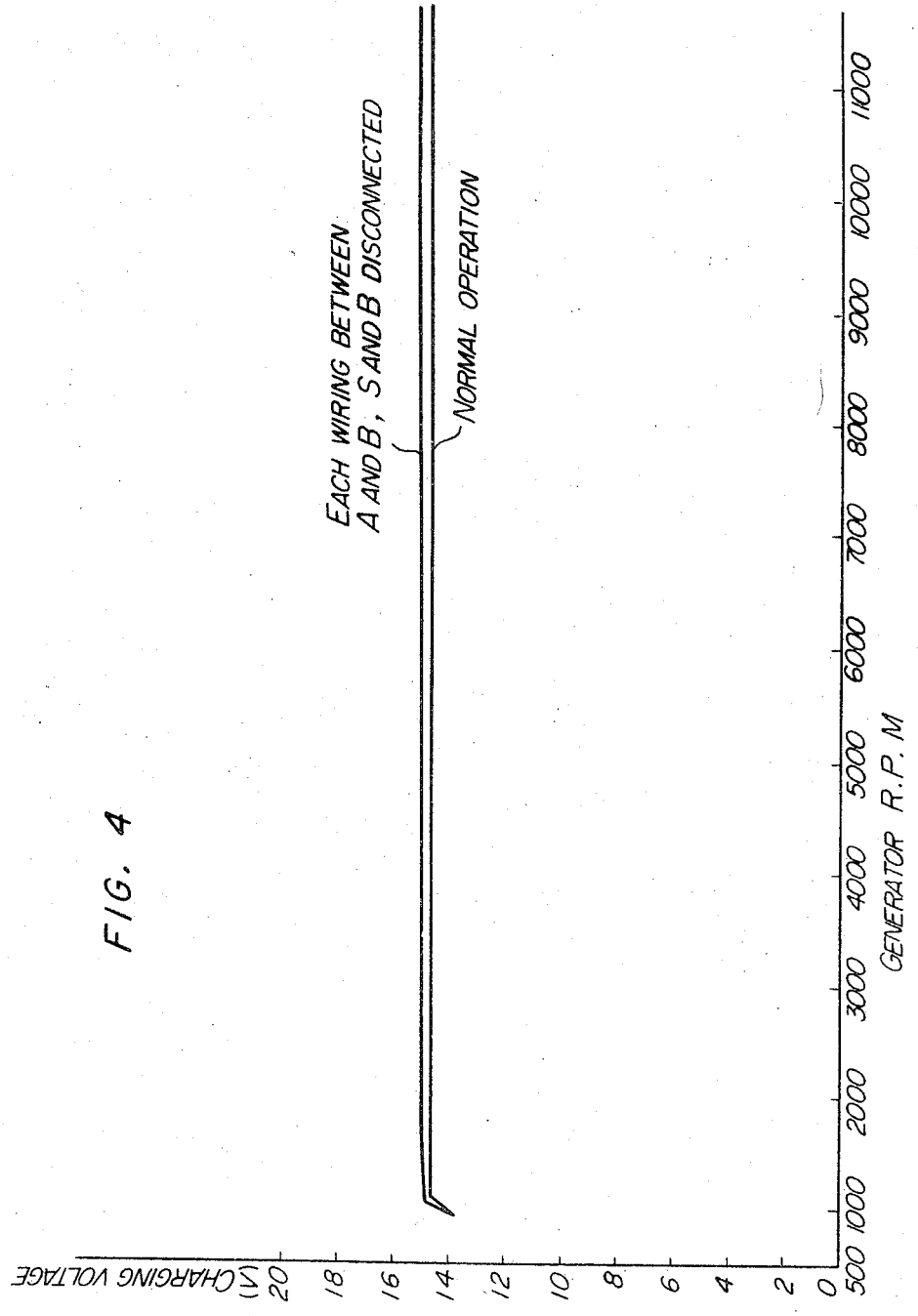

VOLTAGE PROTECTION CIRCUIT FOR TRANSISTOR REGULATORS

The present invention relates especially to a voltage regulator device of a charging generator employed in automobiles.

A charging generator employed in automobiles is generally coupled directly to the crankshaft of an engine or driven thereby through a coupling belt, and a battery is normally arranged at a position apart from the engine in order to utilize effectively the inner space within the engine room or taking other conditions into consideration. Accordingly, a long wiring distance is inevitable between the output terminal of the generator and the battery. Hence, the wiring of the charging circuit is laid under a danger of breaking due to severe driving, vibrations, etc., and particularly a trouble of disconnection or a faulty connection of the wiring with the terminal for detecting the battery voltage of the voltage regulator has often been experienced. If such a trouble occurs, the voltage regulator circuit, of course, loses its voltage regulating function and causes an uncontrolled state, and the exciting current increases depending on the revolution of the engine thereby infinitely increasing the output voltage of the generator.

In consequence, a heavy current beyond the allowable limit flows through the associated equipments and the voltage regulator device, thereby causing damage to the above-mentioned equipments or device.

An object of the present invention is, in a voltage control device for controlling the exciting current of a charging generator by detecting the battery terminal voltage, to protect the voltage regulator device, the generator and the associated equipments from being damaged on account of the uncontrollability of the voltage regulator device caused by an open circuit due to a wire breaking in the charging circuit, disconnection of the wiring from the connecting terminal in the charging circuit, or disconnection in the detection circuit of the battery voltage, or to prevent overcharging the battery.

Another object of the present invention is, in the case of an increase of resistance in the wiring due to a wire breaking or a faulty connection in the charging circuit, to prevent the output current of the generator from flowing into the detection circuit of the battery charging voltage by means of the emergency voltage detection circuit according to the present invention.

A further object of the present invention is, during a non-driven period of the generator, to prevent the battery from discharging through the emergency voltage detection circuit and the field winding of the generator.

According to the present invention, an emergency voltage detection circuit is added to the output terminal of the generator so that the output voltage which increases depending on the revolution of the engine may be detected even in the case of a disabled state of the battery charging circuit, or the detection circuit of the battery voltage and the voltage regulator device may maintain their functions therethrough, whereby always preventing the battery, the voltage regulator device and other electrical loads from being applied with an abnormally high voltage by means of controlling the current flowing through the field winding and thereby preventing an abnormal rise of the output voltage.

The accompanying drawings will be explained hereunder, wherein:

FIG. 4 is a diagram showing the characteristic curves of the charging voltage versus the revolution speed of the generator.

Figure 1:
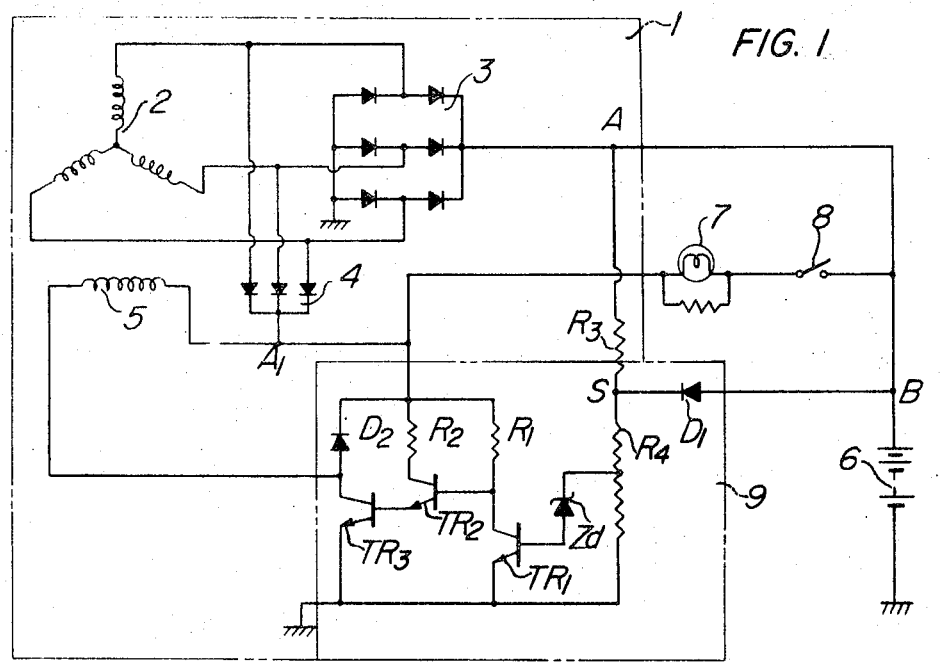
FIG. 1 is a wiring diagram for the electric circuit of the voltage regulator device of the charging generator according to the present invention.

Now, referring to FIG. 1 which shows a first embodiment of the present invention, a generating section, which is connected with a three-phase full-wave rectifier 3 and an auxiliary rectifier 4 at the output ends of generating coils 2 arranged in a Y-connection, and which is provided with DC output terminals A and $A_1$ each thereof, is excited with a field winding 5, and the above-mentioned output terminal A is connected with the terminal B of a battery 6. The field winding 5 is excited with a current from the battery 6 at the starting of the engine and excited with the output current of the auxiliary rectifier 4 when the generated voltage exceeds the battery voltage as the revolution of the engine increases. Numeral 7 designates a charge indicator lamp, one end of which is connected with the battery terminal B through a switch 8, and the other end of which is connected with the voltage regulator device 9 possessing the output terminal $A_1$ of the auxiliary rectifier 4 in common therewith. The charge indicator lamp 7 is turned off after the engine has started.

The structure of the aforesaid voltage regulator device will be explained hereunder. Symbol $TR_1$ designates a first transistor, whose emitter is grounded, whose collector is connected with the base of a second transistor $TR_2$, and whose base is connected with a Zener diode Zd. One end of the Zener diode Zd is connected with a common terminal S both of a detection circuit of the battery voltage having a reverse current blocking diode $D_1$ and a detection circuit of the output voltage having a resistor $R_3$ through a voltage divider resistor $R_4$, and, when the divided voltage from the voltage divider resistor $R_4$ reaches the Zener voltage, the Zener diode Zd conducts to give a signal to the transistor $TR_1$ thereby operating the transistor $TR_1$.

Symbol $TR_3$ designates a third transistor, whose base is connected with the emitter of the second transistor $TR_2$, whose emitter is grounded, and whose collector is connected with a diode $D_2$. The other terminal of the diode $D_2$ is connected with the output terminal $A_1$ of the auxiliary rectifier together with each one end of collector resistors $R_1$ and $R_2$, respectively, of the transistors $TR_1$ and $TR_2$. It should be noted in the above-mentioned circuit that the resistance of the resistor $R_3$ in the detection circuit of the output voltage is chosen so that the diode $D_1$ may always conduct surely.

In the regulator circuit having such a construction, when the switch 8 is turned on, a voltage from the battery 6 is applied across the base of the transistor $TR_2$ and the emitter of the transistor $TR_3$ through the charge indicator lamp 7, thereby making the transistor $TR_3$ conductive and causing an exciting current to flow through the field winding 5. Then, as the engine is started and the output currents are taken out from the output terminals A and $A_1$, the battery terminal B and the auxiliary output terminal $A_1$ are brought to the same potential, thereby turning the charge indicating lamp off.

On the other hand, the battery charging voltage is detected at the common terminal S through the conducting diode $D_1$. Suppose now that the regulated voltage is set at 14.5 V, for example, as shown in FIG. 4. Then, when the charging voltage reaches the set voltage, the Zener diode Zd detects the charging voltage through the voltage divider resistor to make itself conductive, thereby turning the transistor $TR_1$ on by applying a signal thereto and making the transistors $TR_2$ and $TR_3$ non-conductive.

Accordingly, the output current of the auxiliary rectifier 4 does not flow through the field winding 5, so the output voltage of the generator is reduced because there is no excitation thereof. When the output voltage is reduced to be not larger than the regulated voltage, the Zener diode Zd becomes non-conductive, thereby turns the transistor $TR_1$ non-conductive and consequently turns the transistors $TR_2$ and $TR_3$ on restoring their functions again so as to make a current flow through the field winding 5 and re-energize the field circuit of the generator.

Under normal conditions, the above-mentioned operations are repeated to control the exciting current, to regulate the output voltage and to maintain the battery charging voltage at a constant value.

Suppose now that a wire breaks in the section A-B of the charging circuit while the vehicle is running.

Under these conditions, it is of course impossible to charge the battery 6; however, an output current flows from the output terminal A through the emergency voltage detection circuit composed of the resistor $R_3$ and the voltage divider resistor $R_4$. Hence the Zener diode Zd detects the abnormally high output voltage of the generator and operates the voltage regulator device 9 at its Zener breakdown point in the same way as in the normal wiring condition, thereby controlling the current flowing through the field winding 5 and consequently regulating the output voltage.

Also, in the case of a wire breaking in the section B-S, namely the detection circuit of the battery voltage, the output voltage is detected through the emergency voltage detection circuit to make the Zener diode Zd conductive and to operate the voltage regulator device 9, thereby controlling the current flowing through the field winding 5 and consequently regulating the output voltage. Hereupon, the diode $D_1$ connected in the section B-S or the detection circuit of the battery voltage serves to prevent the output current of the generator from flowing into the detection circuit section B-S having a comparatively small current capacity, in the case of a wire breaking in the section A-B of the charging circuit, or a faulty charging circuit, etc.

Figure 2:
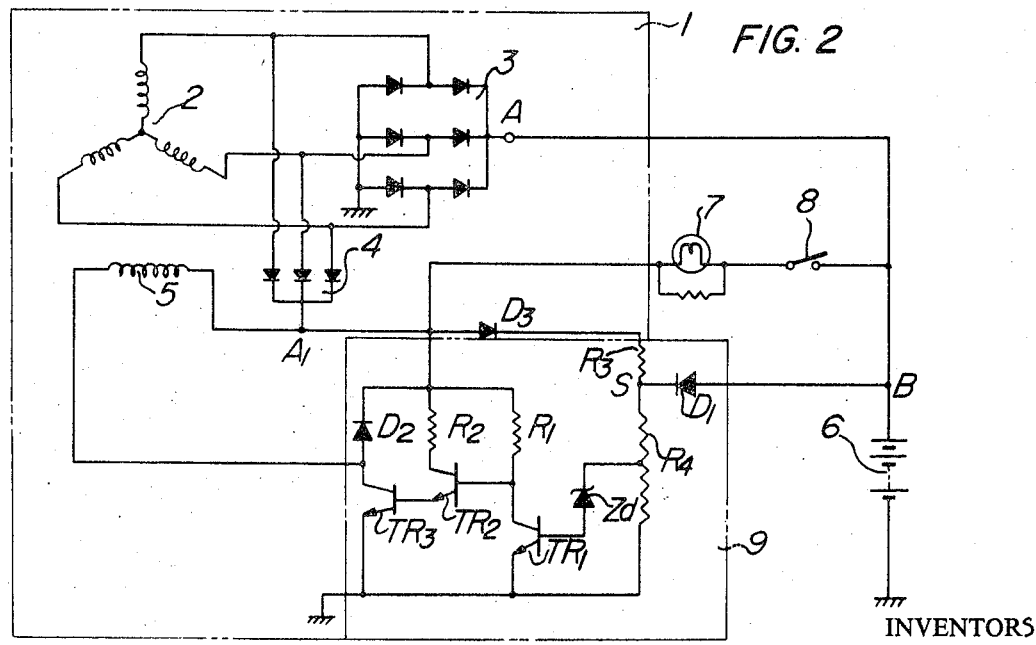
FIGS. 2 and 3 are wiring diagrams for the electric circuits of the voltage regulator devices in the other embodiments of the present invention.

In a second embodiment according to the present invention shown in FIG. 2, an emergency voltage detection circuit composed of a diode $D_3$ and a resistor $R_3$ is provided between the output terminal $A_1$ of the auxiliary rectifier 4 and the terminal S in the detection circuit of the battery voltage. In the same way as in the first embodiment, the emergency operation circuit is utilized in the case of a disabled circuit state of the section A-B of the charging circuit or the section B-S, namely the detection circuit of the battery voltage, to detect the output voltage by means of the Zener diode Zd and to operate the voltage regulator device 9, thereby controlling the current flowing through the field winding 5 and consequently regulating the output voltage of the generator. In the circuit mentioned above, the diode $D_3$ serves to prevent the battery 6 from discharging through the field winding 5 during a non-driven period of the generator.

Figure 3:
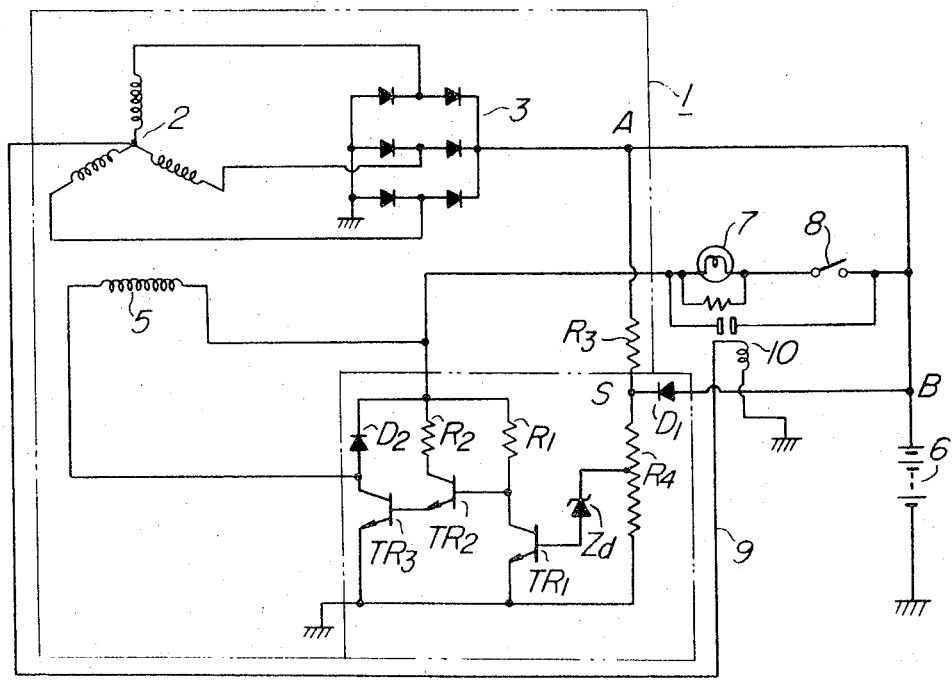

Further, in a third embodiment according to the present invention shown in FIG. 3, the auxiliary rectifier 4 in FIG. 1 had been removed, and the field winding 5 and the connection point in the voltage regulator device 9 with the power source thereto connected with the DC output terminal A through a relay 10 which is operated by being supplied with a voltage from the neutral point of the generating coils 2. In this case, the charge indicator lamp 7 is turned off and on respectively with the make-and-break of the contacts of the relay 10.

What is claimed is:

1. A voltage regulator device of a generator for vehicles comprising:
    an AC generator having an output winding and a field winding;
    a rectifier means having a main rectifier circuit and an auxiliary rectifier circuit;
    a battery connected to an output terminal of said main rectifier circuit; a Zener diode and a diode;
    a switching circuit means for controlling a field current flowing through said field winding in response to conduction of said Zener diode, an output terminal of said switching circuit means being connected to an output terminal of said auxiliary rectifier circuit through said field winding;
    a voltage divider whose output terminal is connected to an input terminal of said switching circuit means through said Zener diode and whose input terminal is connected to said battery through said diode, one end of said diode being connected to said battery and the other end thereof being connected to said input terminal of said voltage divider; and
    a resistor connected between said output terminal of said main rectifier circuit and said input terminal of said voltage divider.

2. A voltage regulator device of a generator for vehicles comprising:
    an AC generator having an output winding and a field winding;
    a rectifier means having a main rectifier circuit and an auxiliary rectifier circuit;
    a battery connected to an output terminal of said main rectifier circuit; a Zener diode and a diode;
    a switching circuit means for controlling a field current flowing through said field winding in response to conduction of a Zener diode, an output terminal of said switching circuit means being connected to an output terminal of said auxiliary rectifier circuit through said field winding;
    a voltage divider whose output terminal is connected to an input terminal of said switching circuit means through said Zener diode and whose input terminal is connected to said battery through said diode, one end of said diode being connected to said battery and the other end thereof being connected to said input terminal of said voltage divider; and
    a series circuit of a resistor and a diode which is connected between said input terminal of said voltage divider and said output terminal of said auxiliary rectifier, whereby a current flows from said auxiliary rectifier circuit to said input terminal of said voltage divider when the potential of said output terminal of said auxiliary rectifier circuit is higher than that of said input terminal of said voltage divider.

3. A charging voltage regulator device for regulating the operation of a generator, which has an output winding arrangement and a field winding, and a source of power connected with said output winding arrangement and being further selectively connected to supply energizing current to said field winding in accordance with the operation of said regulating device, comprising:
   a switching circuit having an input and an output, said output being connected to said field winding;
   a voltage dividing means and a first diode connected in series with each other and connected in parallel with the terminal end connection points across which said power source is connected, the voltage dividing point of said voltage dividing means being connected to the input of said switching circuit and one end of said diode being connected to one of said terminal end connection points; and
   a resistor connected between the point at which an output from said output winding is derived and the junction of said diode and said voltage dividing means.

4. A charging voltage regulator device according to claim 3, wherein said switching circuit comprises a transistor circuit having an input and an output, the output being connected to said field winding and the input being connected to one end of a Zener diode, the other end of said Zener diode being connected to the voltage dividing point of said voltage dividing means.

5. A charging voltage regulator device according to claim 4, wherein said generator comprises an AC generator and further includes a rectifying means connected between said output winding arrangement and said resistor and an auxiliary rectifying means connected between said output winding arrangement and the output of said switching circuit.

6. A charging voltage regulator device for regulating the operation of a generator, which has an output winding arrangement and a field winding, and a source of power connected with said output winding arrangement and being further selectively connected to supply energizing current to said field winding in accordance with the operation of said regulating device, comprising:
   a switching circuit having an input and an output, said output being connected to said field winding;
   a voltage dividing means and a first diode connected in series with each other and connected in parallel with the terminal end connection points across which said power source is connected, the voltage dividing point of said voltage dividing means being connected to the input of said switching circuit and one end of said diode being connected to one of said terminal end connection points; and
   a resistor and a second diode connected in series between one end of said field winding and the junction point of said first diode and said voltage dividing means.

7. A charging voltage regulator device according to claim 6, wherein said switching circuit comprises a transistor circuit having an input and an output, the output being connected to the other end of said field winding and the input being connected to one end of a Zener diode, the other end of said Zener diode being connected to the voltage dividing point of said voltage dividing means.

8. A charging voltage regulator device according to claim 7, wherein said generator comprises an AC generator and further includes a rectifying means connected between said output winding arrangement and a wire connected to said power source and an auxiliary rectifying means connected between said output winding arrangement and the output of said switching circuit.

* * * * *